United States Patent
Wang et al.

(10) Patent No.: US 9,667,478 B2
(45) Date of Patent: May 30, 2017

(54) MULTIPLE OPERATOR RADIO ACCESS NETWORK (MORAN) IN A TELECOMMUNICATIONS SYSTEM

(71) Applicant: TELEFONAKTIEBOLAGET L M ERICSSON (PUBL), Stockholm (SE)

(72) Inventors: Xiaoling Wang, Sollentuna (SE); Olof Axel Granberg, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/433,547

(22) PCT Filed: Oct. 3, 2013

(86) PCT No.: PCT/EP2013/070622
§ 371 (c)(1),
(2) Date: Apr. 3, 2015

(87) PCT Pub. No.: WO2014/053597
PCT Pub. Date: Apr. 10, 2014

(65) Prior Publication Data
US 2015/0304162 A1    Oct. 22, 2015

Related U.S. Application Data

(60) Provisional application No. 61/709,284, filed on Oct. 3, 2012.

(51) Int. Cl.
*H04L 12/24* (2006.01)
*H04W 24/02* (2009.01)
*H04W 28/26* (2009.01)
*H04W 84/04* (2009.01)

(52) U.S. Cl.
CPC ......... *H04L 41/0803* (2013.01); *H04W 24/02* (2013.01); *H04W 28/26* (2013.01); *H04W 84/042* (2013.01)

(58) Field of Classification Search
None
See application file for complete search history.

(56) References Cited

U.S. PATENT DOCUMENTS 6,032,046 A * 2/2000 Nakano ................. H04W 16/04
370/329
6,035,219 A * 3/2000 Brodie .................. H04W 16/02
455/447

(Continued)

OTHER PUBLICATIONS

ZTE: "Clarification on the requirement for network sharing," 3GPP Draft; R3-112900 Clarification on the Requirement for Network Sharing, 3rd Generation Partnership Project (3GPP), Mobile Competence Centre; 650, Route des Lucioles; F-06921 Sophia-Antipolis Cedex, France, vol. RAN WG3, no. San Francisco, USA; 20111114-20111118, Nov. 4, 2011.*

(Continued)

*Primary Examiner* — Andrew Oh

(57) ABSTRACT

A method in a network node for configuring the network node for a first and at least one second Public Land Mobile Network (PLMN) in a telecommunications system. The network node serves one or more cells. The network node configures a primary PLMN information for the one or more cells to comprise neither of the first or the at least one second PLMN. The network node configures further PLMN information for each cell of the one or more cells in the network node based on information indicating to which of the first or at least one second PLMNs each cell belongs to.

12 Claims, 4 Drawing Sheets

(56) References Cited

U.S. PATENT DOCUMENTS

| | | | | |
|---|---|---|---|---|
| 2009/0186623 A1* | 7/2009 | Matsuzawa | ........... | H04W 16/30 455/447 |
| 2011/0134878 A1* | 6/2011 | Geiger | ................ | H04W 48/20 370/330 |
| 2011/0223887 A1* | 9/2011 | Rune | .................... | H04L 63/101 455/411 |
| 2011/0243097 A1* | 10/2011 | Lindqvist | ............. | H04W 24/02 370/331 |
| 2012/0147834 A1* | 6/2012 | Zisimopoulos | ... | H04L 29/12066 370/329 |
| 2012/0155324 A1* | 6/2012 | Janakiraman | ......... | H04L 43/028 370/254 |
| 2012/0157095 A1* | 6/2012 | Fodor | .................... | H04W 4/08 455/434 |
| 2013/0121241 A1* | 5/2013 | Sebire | .................. | H04W 48/18 370/328 |
| 2013/0273908 A1* | 10/2013 | Anantharaman | ....... | H04W 8/18 455/432.1 |
| 2014/0024306 A1* | 1/2014 | Redana | ................ | H04B 7/2606 455/7 |
| 2014/0228031 A1* | 8/2014 | Masini | ............. | H04W 36/0083 455/436 |
| 2014/0308958 A1* | 10/2014 | Amirijoo | ............. | H04W 36/08 455/436 |
| 2014/0348068 A1* | 11/2014 | Morper | ................ | H04W 88/16 370/328 |
| 2015/0038144 A1* | 2/2015 | Ahlstrom | ............. | H04W 24/02 455/436 |

OTHER PUBLICATIONS

3GPP TS 36.304 V11.1.0, 3rd Generation Partnership Project; Technical Specification Group Radio Access Network; Evolved Universal Terrestrial Radio Access (E-UTRA); User Equipment (UE) procedures in idle mode (Release 11) Sep. 2012.*

Wray Castle, "LTE Evolved Packet Core Network," Bridge Mills, Stramongate Kendal, UK, Sep. 2012.*

ZTE: "Clarification on the requirement for network sharing," 3GPP Draft; R3-112900 Clarification on the Requirement for Network Sharing, 3rd Generation Partnership Project (3GPP), Mobile Competence Centre; 650, Route des Lucioles; F-06921 Sophia-Antipolis Cedex, France, vol. RAN WG3, no. San Francisco, USA; 20111114-20111118, Nov. 4, 2011, XP050566108.

ZTE: "Discussion on the scenarios for network sharing," 3GPP Draft; R3-120036 Discussion on the Scenarios for Network Sharing, 3rd Generation Partnership Project (3GPP), Mobile Competence Centre; 650, Route des Lucioles; F-06921 Sophia-Antipolis Cedex, France, vol. RAN WG3, no. Dresden, Germany; 20120206-20120210, Jan. 31, 2012, XP050566569.

MCC: "Report of 3GPP TSG RAN WG3 meeting #75," 3GPP Draft; R3-120463, 3rd Generation Partnership Project (3GPP), Mobile Competence Centre; 650, Route des Lucioles; F-06921 Sophia-Antipolis Cedex, France, vol. TSG RAN, no. San Jose del Cabo, Mexico; 20120326-20120330, Apr. 2, 2012, XP050668844, retrieved from the Internet: URL:http://www.3gpp.org/ftp/tsg_ran?WG3_lu/TSGR3_75bis/Docs/ [retrieved on Apr. 2, 2012] p. 16.

Motorola: "Indicate primary PLMN Id in plmnIdList attribute," 3GPP Draft; 32762_CR0022_(Rel-9)_S5-094318 CR R9 32.762 Indicate Primary PLMN ID in PLMNIDLIST Attribute, 3rd Generation Partnership Project (3GPP), Mobile Competence Centre; 650, Route des Lucioles; F-06921 Sophia-Antipolis Cedex, France, vol. SA WG5, No. Shanghai; 20091109, Nov. 30, 2009, XP050528599 [retrieved on Nov. 30, 2009] the whole document.

3GPP TS 36.331 V10.7.0, 3rd Generation Partnership Project; Technical Specification Group Radio Access Network; Evolved Universal Terrestrial Radio Access (E-UTRA); Radio Resource Control (RRC); Protocol specification (Release 10) Sep. 2012.

* cited by examiner

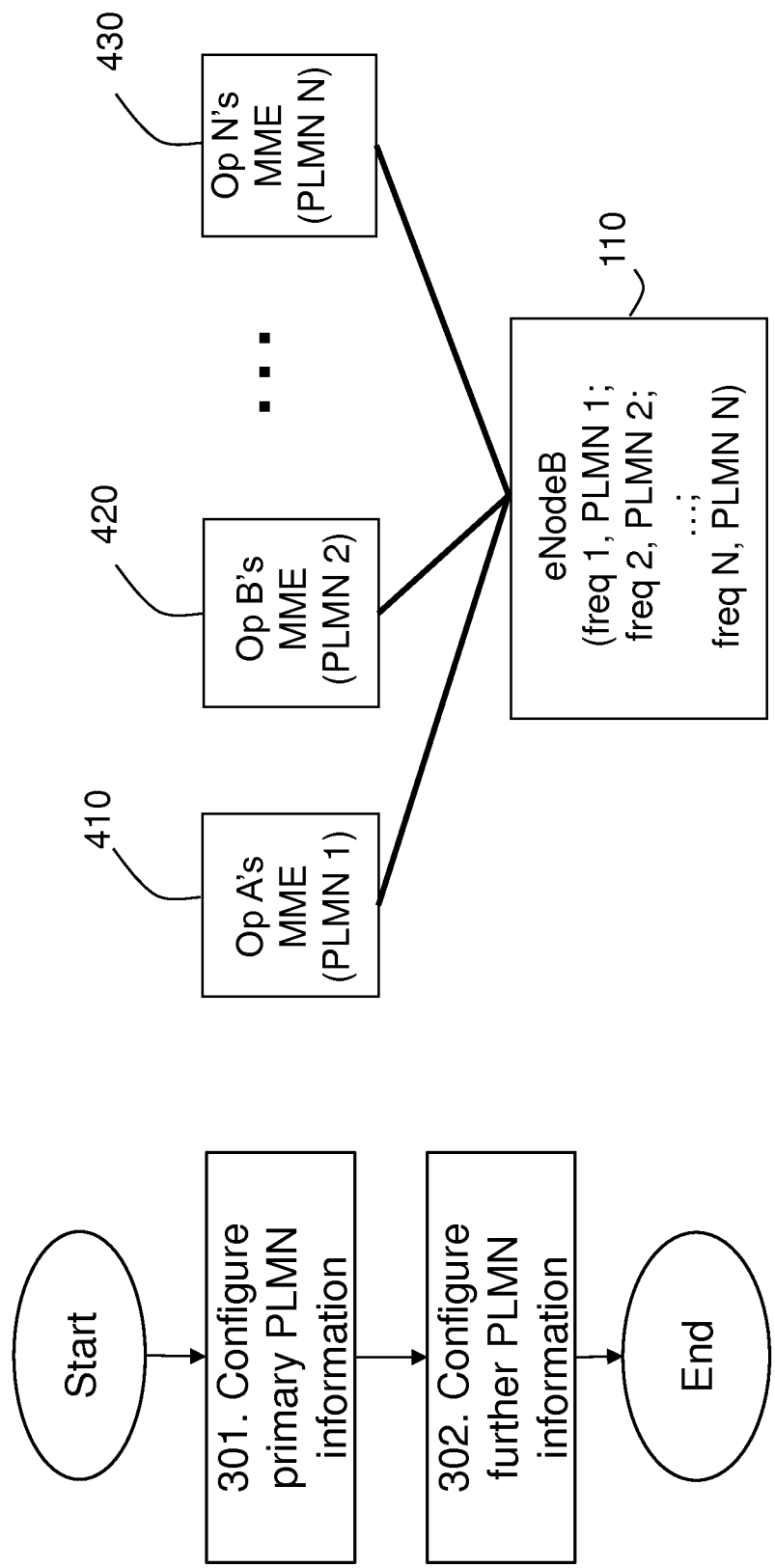

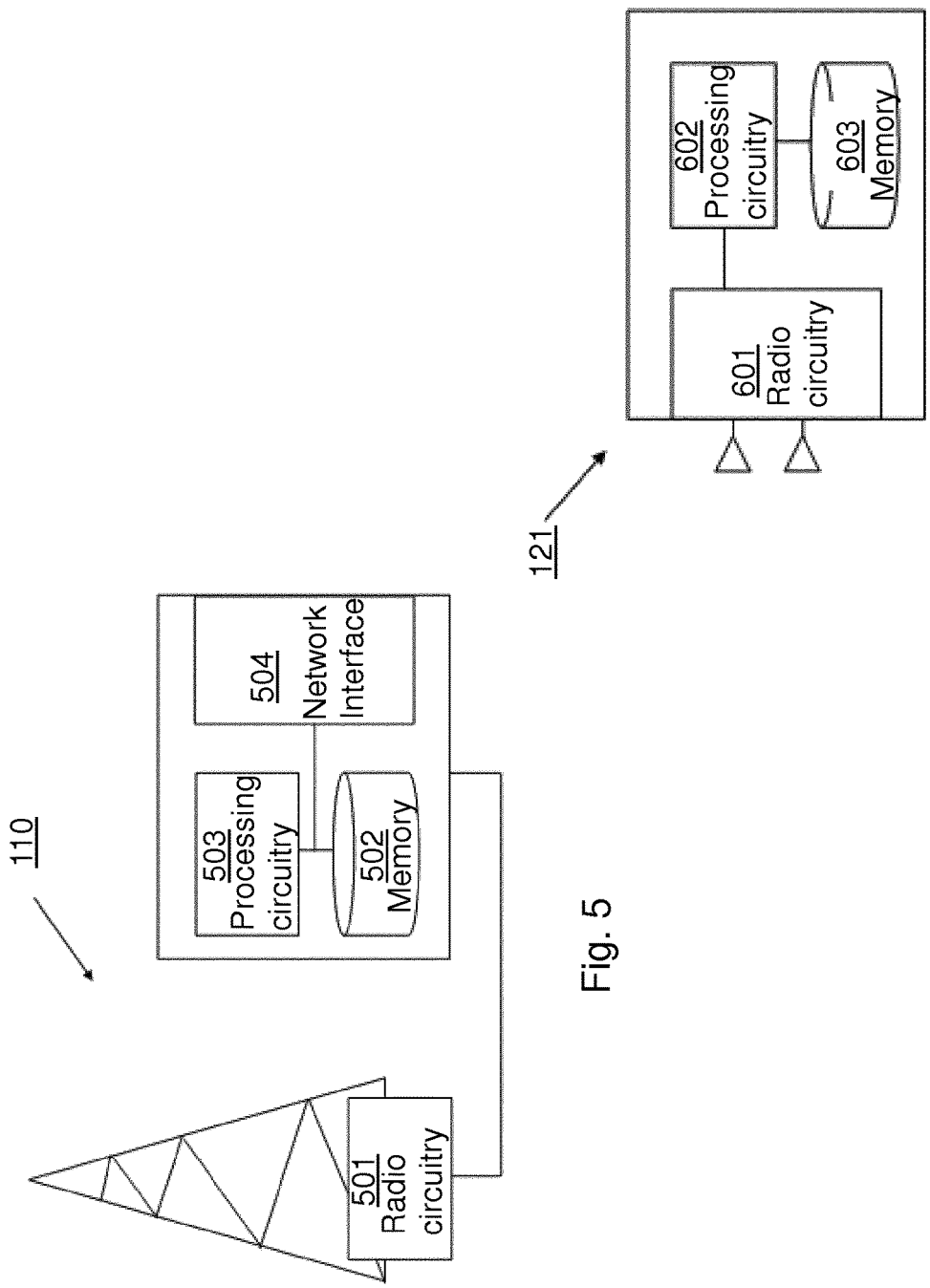

MULTIPLE OPERATOR RADIO ACCESS NETWORK (MORAN) IN A TELECOMMUNICATIONS SYSTEM

This application is a 371 of International Application PCT/EP2013/070622, filed Oct. 3, 2013, which claims the benefit of U.S. Provisional Application No. 61/709,284, filed Oct. 3, 2012, the disclosures of which are fully incorporated herein by reference.

TECHNICAL FIELD

Embodiments herein relate to Shared Networks (SN) in a telecommunications system. In particular, embodiments herein relate to the deployment of a MORAN in a telecommunications system.

BACKGROUND

A core network operator provides its telecommunications services to user equipments, such as, e.g. mobile phones, etc., through a Public Land Mobile Network, (PLMN). A PLMN typically comprises a Radio Access Network (RAN) and a Core Network (CN). Conventionally, a single operator provides its telecommunications services to its subscribers) via its own RAN and CN networks.

A Shared Network makes it possible for operators to share parts of their RAN or CN networks. This may be beneficial in order to decrease deployment costs and expenditures, but also helps to alleviate the environmental footprint left by system deployment.

A few examples of possible SN configurations for multiple PLMNs are illustrated in FIG. 1. In FIG. 1, the hatched boxes represent operator A's nodes or resources. The dotted boxes represent operator B's nodes or resources. The boxes with vertical lines represent shared nodes or resources. The continuous lines in FIG. 1 represent control plane and user plane, and the dotted line represent user plane only. Note that FIG. 1 uses two operators, operator A and B, only as an example and that any other suitable number of operators are applicable. The six columns in FIG. 1 illustrate six different example embodiments of SN configurations. For each of the six possible SN configurations, the sharing of the Packet Data Network Gateway (PDN GW, PGW), Home Subscriber Server (HSS), applications, Serving GW (SGW), Mobility Management Entities (MME), evolved NodeB (eNB) and cell are shown in respective rows. Site Sharing is a network configuration in which a site or location for operator specific RAN network nodes, e.g. eNodeBs in a RAN, is shared between two or more CNs, i.e. two or more operators. Each network operator has its own separate core network, i.e. MME, SGW, PDN GW, HSS, etc. in site sharing. A Geographical Split Network is a network configuration in which network operators share networks by allowing national roaming in their respective coverage areas. A Gateway Core Network (GWCN) is a network configuration in which both RAN, i.e. eNB, and MME is shared by two or more network operators; the core network parts, i.e. SGWs, PDN GW, HSS, etc. are located in each network operators own network. In a Roaming Network (RN) configuration, two or more operators share the RAN node, i.e. eNB. A Multiple Operator Core Network (MOCN) is a network configuration in which two or more network operators share a RAN, i.e. eNB; however, each network operator has its own separate core network, i.e. MME, SGW, PDN GW, HSS, etc.

MORAN (or "Split in the eNodeB") is a network configuration in which, in addition to sharing a RAN network node, i.e. eNB, the resources of the RAN network node may be split for two or more network operators. In MORAN, each network operator has its own separate core network, i.e. MME, SGW, PDN GW, HSS, etc.

However, it should be noted that no matter which of the network configurations that are deployed, the PLMNs to which a cell belongs are given in the system information which is broadcast in each cell. A cell belongs always to at least one PLMN.

Furthermore, a shared network cell is considered to belong to all PLMNs given in the system information.

As more and more operators are interested in sharing RAN networks by, for example, owning different frequencies/cells, a fully incorporated MORAN network configuration is becoming increasingly interesting.

However, as the standard Evolved-Universal Terrestrial Radio Access (E-UTRA) Radio Resource Control (RRC) protocol specification, 3rd Generation Partnership Project (3GPP) Technical Specification (TS) 36.331, specifies requirements on the primary PLMN identity in the eNodeB, this may cause difficulties in configuring different PLMN identities for different frequencies/cells in order to obtain a MORAN network configuration.

Furthermore, different PLMN identities for different frequencies/cells in an eNodeB may need different S1 connections between the eNodeB and one MME on the frequency/cell level instead of on the eNodeB level. This further adds complexity when attempting to obtain a MORAN network configuration.

SUMMARY

It is an object of embodiments herein to obtain a MORAN network configuration in a telecommunications system.

According to a first aspect of embodiments herein, the object is achieved by a method in a network node for configuring the network node for a first and at least one second Public Land Mobile Network, PLMN, in a telecommunications system. The network node configures a primary PLMN information for one or more cells in the network node to comprise neither of the first or the at least one second PLMN. Also, the network node configures further PLMN information for each cell of the one or more cells in the network node based on information indicating to which of the first or at least one second PLMNs each cell belongs to.

In some embodiments, the primary PLMN information indicates a PLMN or PLMN identity which is not served by any MME, and thus may be referred to as a dummy PLMN or empty PLMN. This simply means that this PLMN is not owned by any network operator. The primary PLMN information may be used by the network node to set or construct the Global eNodeB Identifier and E-EUTRAN Cell Global identifier (ECGI). The primary PLMN information is the first PLMN identity in the System Information Block Type 1 (SIB1) message used to broadcast cell status and cell reservations to user equipments.

In some embodiments, the information indicating to which of the first or at least one second PLMNs each cell belongs to is configured in the network node, or may be configured in the network node by another network node in the telecommunication system.

In some embodiments, the network node comprises a PLMN list for each cell of the one or more cells. The PLMN list for each cell comprises each of the PLMNs sharing the network node, e.g. the first and at least one second PLMNs.

For each PLMNs in each PLMN list for each cell, the primary and further PLMN information for each cell may be indicated. In the PLMN list, each PLMN may be associated with a cellReservedForOperatorUse Information Element (IE). The cellReservedForOperatorUse IE may indicate the primary and further PLMN information for each PLMN for each cell.

In some embodiments, the network node may configure, for each cell in the network node belonging to a first PLMN, the cellReservedForOperatorUse IE associated with the first PLMN to "Not Reserved". The network node may also configure, for each cell in the network node belonging to a first PLMN, the cellReservedForOperatorUse IE associated with another PLMN, such as, e.g. the second or further PLMN, to "Reserved".

In a similar manner, the network node may configure, for each cell in the network node belonging to a second PLMN, the cellReservedForOperatorUse IE associated with the second PLMN to "Not Reserved". The network node may also configure, for each cell in the network node belonging to a second PLMN, the cellReservedForOperatorUse IE associated with another PLMN to "Reserved". This may be performed by the network node for all cells in the network node, and for all PLMNs in each PLMN list for each cell accordingly.

According to some embodiments, the PLMN list for each cell comprises N number of PLMNs. In some embodiments, N is an integer and N≤5. This is the case e.g. when the SIB1 is used to broadcast the cell status and cell reservations to user equipments, since the SIB1 may only broadcast up to six (6) PLMN identities, including the primary PLMN.

In some embodiments, the network node may refrain from configuring frequency relations between different frequencies in the network node, e.g. by not configuring a "freqRelation" managed object in the MOM to define the relation between different frequencies. This may advantageously prevent HO to be performed between frequencies belonging to different PLMNs, i.e. different network operators.

In some embodiments, the network node may refrain from configuring relations between cells in the network node which do not belong to the same PLMN, e.g. by not configuring a "EUtranCell Relation" data field or IE to define the relation between different cells which does not belong to the same PLMN. This may advantageously prevent handover to be performed between cells belonging to different PLMNs, i.e. different network operators.

According to some embodiments, by using this configuration, the user equipments belonging to a first network operator operating the first PLMN are only permitted to select/reselect cells belonging to the first PLMN. Hence, the PLMNs of different network operators may be made disjunctive and operated separately from each other within the same network node.

According to a second aspect of embodiments herein, the object is achieved by a network node for configuring the network node for a first and at least one PLMN in a telecommunications system. The network node is being adapted to serve one or more cells. The network node comprises a processing circuitry which is configured to configure a primary PLMN information for the one or more cells to comprise neither of the first or the at least one second PLMN. The processing circuit is further configured to configure further PLMN information for each cell of the one or more cells in the network node based on information indicating to which of the first or at least one second PLMNs each cell belongs to.

Embodiments herein afford many advantages, of which a non-exhaustive list of examples follows:

Hence, according to the above, a technique to provide a simple and easy way to obtain a MORAN network configuration in a telecommunications system is presented.

The embodiments herein also provide a simple and easy way to deploy different MORAN network configurations in a telecommunications system, such as, e.g. based on a MOCN, a GWCN or a MORAN network configuration.

Since a MORAN network configuration may require different S1 connections between the network node and more central nodes in the PLMNs of the different network operators, a fully incorporated MORAN network configuration may be very difficult to achieve. This disadvantage is overcome by the embodiments presented herein.

The embodiments herein are not limited to the features and advantages mentioned above. A person skilled in the art will recognize additional features and advantages upon reading the following detailed description.

BRIEF DESCRIPTION OF THE DRAWINGS

The above and other features and advantages of the embodiments will become readily apparent to those skilled in the art by the following detailed description of exemplary embodiments thereof with reference to the accompanying drawings, wherein:

FIG. 3 is flowchart illustrating embodiments of a method for configuring a network node, FIG. 4 is a schematic block diagram illustrating embodiments in a telecommunications system, FIG. 5 is a schematic block diagram of embodiments of a network node, FIG. 6 is a schematic block diagram of embodiments of a user equipment.

DETAILED DESCRIPTION

Figure 1:
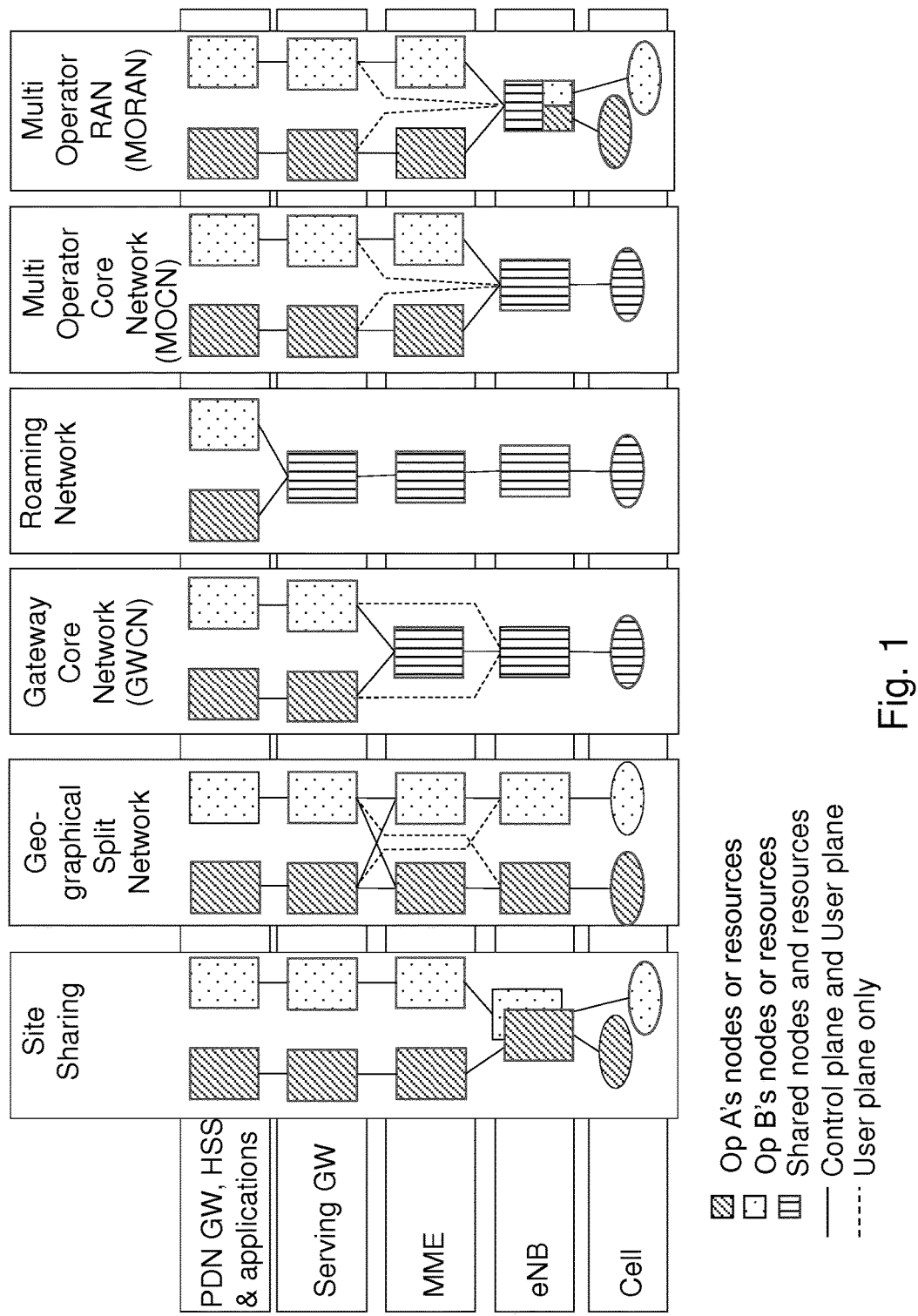
FIG. 1 is a schematic block diagram illustrating possible SN configurations for multiple PLMNs in a telecommunications system.

The figures are schematic and simplified for clarity, and they merely show details which are essential to the understanding of the embodiments, while other details have been left out. Throughout, the same reference numerals are used for identical or corresponding parts or steps.

It should be noted that a Long Term Evolution (LTE) RAN comprises eNB and cells, as shown e.g. in FIG. 1. Thus, from an LTE RAN perspective, the following Shared Network configuration may have impacts on the LTE RAN: MOCN, GWCN, and MORAN.

Figure 2:
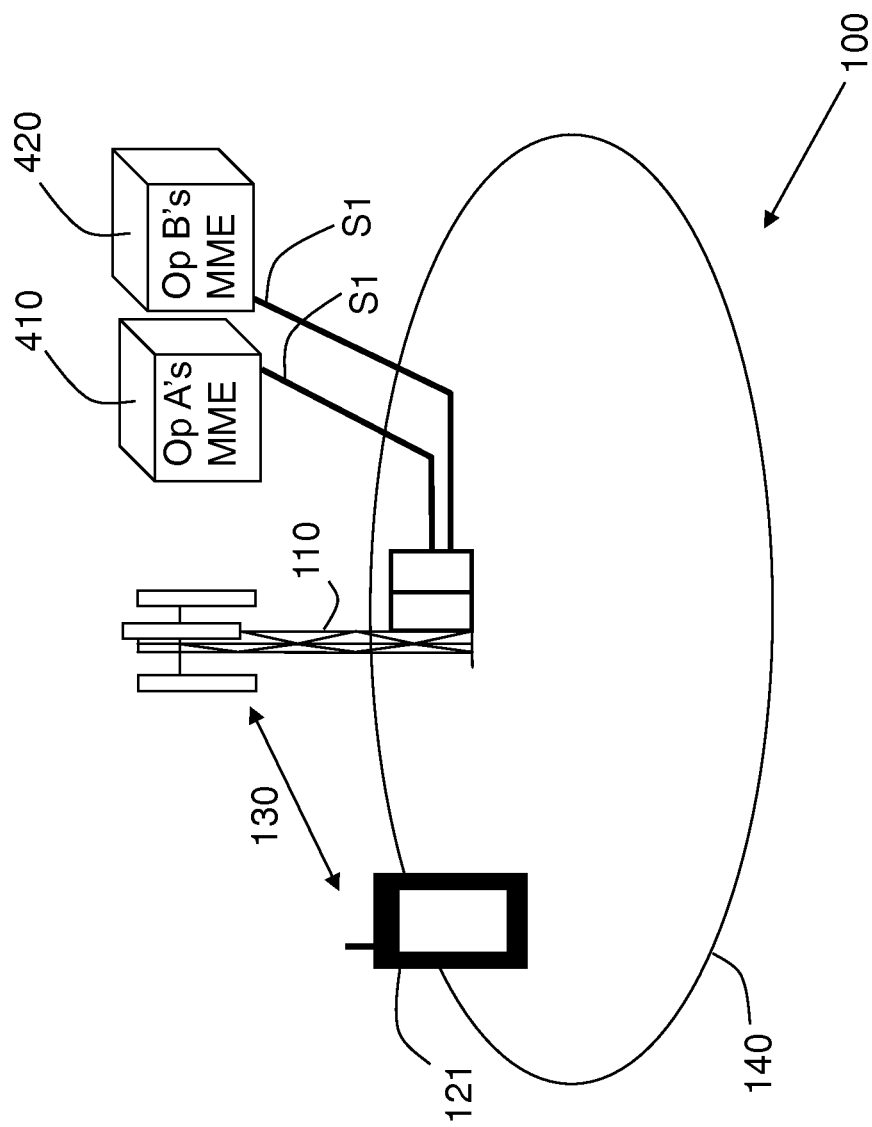
FIG. 2 is a schematic block diagram illustrating embodiments in a telecommunications system.

FIG. 2 depicts a telecommunications system 100 in which embodiments herein may be implemented. The telecommunications system 100 is a wireless communication network such as an LTE, Wideband Code Division Multiple Access (WCDMA), Global System for Mobile Communications (GSM) network, any 3GPP cellular network, or any cellular network or system.

The telecommunications system 100 comprises a base station, which is a network node and is therefore referred to herein as the network node 110. The network node 110 serves at least one cell, such as, e.g. the cell 140. The network node 110 may in this example e.g. be an eNB, an eNodeB, or a Home Node B, a Home eNode B, a femto Base Station (BS), a pico BS or any other network unit capable to serve a user equipment or a machine type communication device which are located in the cell 140 in the telecommunications system 100.

A user equipment 121 is located within the cell 140. The user equipment 121 is configured to communicate within the telecommunications system 100 via the network node 110 over a radio link 130 when the user equipment 121 is present in a cell, such as, e.g. the cell 140, served by the network node 110. The user equipment 121 may e.g. be a mobile terminal, a wireless terminal, a mobile phone, a computer such as e.g. a laptop, a Personal Digital Assistant (PDA) or a tablet computer, sometimes referred to as a surf plate, with wireless capability, a device equipped with a wireless interface, such as a printer or a file storage device or any other radio network unit capable of communicating over a radio link in a telecommunications system 100.

According to the illustrative example shown in FIG. 2, the network node 110 is connected to a first and a second MME 410, 420, via a respective S1 connection. An S1 connection is a logical interface between a network node 110 and an Evolved Packet Core (EPC) providing an interconnection point between the E-UTRAN and the EPC.

In this illustrative example, the first MME 410 belongs to a first network operator A, and the second MME 420 belongs to a second network operator B. However, it should be noted that the embodiments presented herein also may be implemented in a GWCN network, where both network operator share the same MME but have different serving GWs, as shown in FIG. 1.

The network node 110 is configured to broadcast cell status and cell reservations to user equipments, such as, e.g. the user equipment 121, located within each of its cells, such as, e.g. the cell 140. This is performed over the radio link 130. Also, this may be performed by using a SIB1 message. The SIB1 message may indicate the cell status and cell reservations by using data fields or IEs. These data fields or IEs may be denoted as "cellBarred" or "cell Reserved ForOperatorUse". Note that the "cell Barred" and "cell Reserved ForOperatorUse" are different data fields or IEs each comprising different IE types. The data field or IE "cellBarred" may comprise the IE type "barred" or "not barred". The data field or IE "cellReservedForOperatorUse" may comprise the IE type "reserved" or "not reserved".

When multiple PLMNs are indicated in the SIB1, data field or IE "cellBarred" is common for all PLMNs. Also, when the cell status is indicated as "barred", the user equipment's 121 in the cell 140 are not permitted to select/reselect this cell 140, not even for emergency calls.

When the cell status, i.e. data field or IE "cellBarred", is indicated as "not barred" and the cell reservation, i.e. data field or IE "cellReservedForOperatorUse", is indicated as "reserved" for a PLMN of a network operator, all user equipments which are not operating their Home PLMN or Equivalent HPLMN (HPLMN/EHPLMN) will act as "barred". This means that these user equipments are not permitted to select/reselect this cell.

Here, it should be noted that a Home PLMN is a PLMN where the Mobile Country Code (MCC) and the Mobile Network Code (MNC) of the PLMN identity are the same as the MCC and MNC of the International Mobile Subscriber Identity (IMSI).

One aspect is that a network operator today uses the cell reservation, i.e. data field or IE "cellReservedForOperatorUse", for testing the radio access network with its own user equipments, i.e. the user equipments with HPLMN/EHPLMN, and to prevent other network operator's user equipments from to accessing its network.

As part of the developing of the embodiments described herein, a problem will first be identified and discussed.

It has been noticed that a problem with implementing a MORAN network configuration in a telecommunications system 100 is the first PLMN in the IE plmn_IdentityList in the SIB1. In the SIB1, the first PLMN in the IE: plmn_IdentityList in the SIB1 is called the primary PLMN. This primary PLMN is used to construct the Global eNodeB Identifier and ECGI in the network node 110. Hence, the primary PLMN must be defined on the network node level, i.e. eNodeB level, and be valid for all cells in the network node 110, i.e. eNB.

This causes problem for configuring a MORAN network configuration since it thus becomes difficult to configure different PLMN identities for different cells in the network node 110.

Hence, a method and a network node 110 to deploy the MORAN by using MOCN and GWCN are presented herein. This method and network node 110 simply deploys the MORAN with help of the cellReservedForOperatorUse concept, i.e. by using the existing cellReservedForOperatorUse IE.

Example of embodiments of a method in a network node 110 for configuring the network node 110 for more than one PLMN in a wireless telecommunications network 100, will now be described with reference to a flowchart depicted in FIG. 3. The telecommunications system 100 comprises a first and at least one second PLMN. Thus, there may be at least two different network operators, each having its own PLMN, which shares the network node 110. By configuring the network node 110 in the following way, the MORAN may be deployed in the telecommunications system 100.

The method may comprise the following actions, which actions may be taken in any suitable order.

Action 301

In this action 301, the network node 110 configures a primary PLMN information for one or more cells in the network node 110 to comprise neither of the first or the at least one second PLMN.

In some embodiments, the primary PLMN information may indicate a PLMN or PLMN identity which is not served by any MME; therefore, this primary PLMN information may here be referred to as a dummy PLMN or empty PLMN. This simply means that this PLMN is not owned by any network operator.

The primary PLMN information is used by the network node 110 to set the Global eNodeB Identifier and ECGI. The primary PLMN information is also the first PLMN identity in the SIB1 message used by the network node 110 to broadcast cell status and cell reservations to user equipments 121 in the cells of the network node 110.

It should also be noted that it does not matter what status the data field or IE "cellReservedForOperatorUse" is initially set to. The data field or IE "cellReservedForOperatorUse" may be configured as "Reserved" or "Not reserved" for the dummy or empty primary PLMN. The network node 110 may be configured to change it to "Reserved" in the data field or IE "cellReservedForOperatorUse". This may then be sent by the network node 110 to the user equipment 121 in the SIB1 message.

Action 302

In this action 302, the network node 110 configures further PLMN information for each cell of the one or more cells 140 in the network node 110 based on information indicating to which of the first or at least one second PLMNs each cell in the network node 110 belongs to.

In some embodiments, the information indicating to which of the first or at least one second PLMNs each cell belongs to may be configured in the network node 110. Alternatively, the network node 110 may be configured with this information by another network node in the telecommunications system 100, such as, e.g. a management network node or core network node.

In some embodiments, the network node 110 comprises a PLMN list for each cell of the one or more cells 140. The PLMN list for each cell comprises each of the PLMNs sharing the network node 110, e.g. the first and at least one second PLMNs.

For each PLMNs in each PLMN list for each cell, the primary and further PLMN information for each cell may be indicated. In the PLMN list, each PLMN may be associated with a cellReservedForOperatorUse IE. The cellReservedForOperatorUse IE may indicate the primary and further PLMN information for each PLMN for each cell.

In some embodiments, the network node 110 may configure, for each cell in the network node 110 belonging to a first PLMN, the cellReservedForOperatorUse IE associated with the first PLMN to "Not Reserved". The network node 110 may also configure, for each cell in the network node 110 belonging to a first PLMN, the cellReservedForOperatorUse IE associated with another PLMN, such as, e.g. the second or further PLMN, to "Reserved".

In a similar manner, the network node 110 may configure, for each cell in the network node 110 belonging to a second PLMN, the cellReservedForOperatorUse IE associated with the second PLMN to "Not Reserved". The network node 110 may also configure, for each cell in the network node 110 belonging to a second PLMN, the cellReservedForOperatorUse IE associated with another PLMN to "Reserved". This may be performed by the network node 110 for all cells in the network node 110, and for all PLMNs in each PLMN list for each cell accordingly.

In other words, the network node 110 may configure the CellReservedForOperatorUse IE settings for each PLMN. The network operator owned cells in the network node 110 will be configured by the network node 110 to "Not Reserved" for the network operator's own PLMN. The network node 110 also configures the cellReservedForOperatorUse to "Reserved" for all other network operator's PLMNs.

In some embodiments, the network node 110 broadcasts cell status and cell reservations using System Information Block 1, SIB1 and according to the configured primary PLMN information and further PLMN information. The primary PLMN may be the first PLMN identity in the SIB1.

Table 1 shows the result of using the cellReservedForOperatorUse setting for different cells belonging to different network operators as described above. The left column represents the cells belonging to the different network operators and the right column represents the cellReservedForOperatorUse setting for different PLMNs, i.e. "Not Reserved" or "Reserved".

By this configuration, the operator owned user equipments 121 are only permitted to select/reselect its own cells.

TABLE 1

| | cellReservedForOperatorUse setting for different PLMNs |
|---|---|
| Cells belong to Operator A (PLMN A) | PLMN A, "Not Reserved" PLMN B, "Reserved" PLMN N, "Reserved" |

TABLE 1-continued

| | cellReservedForOperatorUse setting for different PLMNs |
|---|---|
| Cells belong to Operator B (PLMN B) | PLMN A, "Reserved" PLMN B, "Not Reserved" PLMN N, "Reserved" |
| Cells belong to Operator N (PLMN N) | PLMN A, "Reserved" PLMN B, "Reserved" PLMN N, "Not Reserved" |

According to some embodiments, the PLMN list for each cell comprises N number of PLMNs. In some embodiments, N is an integer and N≤5. This is the case e.g. when the SIB1 is used to broadcast the cell status and cell reservations to user equipments, since the SIB1 may only broadcast up to six (6) PLMN identities (including the primary PLMN).

In other words, all cells in the network node 110 will all have the same PLMNs configured in their respective PLMN list, e.g. PLMN A, PLMN B, . . . , PLMN N. Note that here, N 5. The reason is that SIB1 may only broadcast maximum of six (6) PLMNS identities, including the primary PLMN or dummy PLMN.

In some embodiments, the network node 110 may refrain from configuring frequency relations between different frequencies in the network node 110, e.g. by not using the "freqRelation" managed object in the managed Object model (MOM) to define the relation between different frequencies. This may advantageously prevent handover to be performed between frequencies belonging to different PLMNs, i.e. different network operators. By this configuration, the MORAN can be deployed based on at least one of MOCN and GWCN.

It may also be noted that this configuration also applies to a scenario wherein multiple network operators share the same network node 110 and having their own different frequencies. This embodiment is also depicted in FIG. 4. The operator A's MME (PLMN 1) 410, the operator B's MME (PLMN 2) 420 and the operator N's MME (PLMN N) 430 is seen in FIG. 4. In FIG. 4, the network node 110 is exemplified with an eNode B. The eNode B 100 comprises information indicating the frequency (freq) 1, PLMN 1, freq 2, PLMN 2, freq N and PLMN N and their relations.

Namely, through such frequency relations, different frequencies will know about each other. For instance, if freq 1 has relation to freq 2, then freq 1 will know about freq 2 and vice versa. Cells are normally defined under frequencies, which mean that cells with freq 1 have a relation to cells with freq 2.

To be able to do handover for a user equipment 121 from the source cell to the target cell, the source cell must have information about the target cell to be able to order the measurement needed and to do handover evaluation, etc.

If cell 1 has no info about cell 2, i.e. no relation to cell 2, then cell 2 can never be the target cell for the handover. Hence, in this case, the handover for the user equipment 121 from cell 1 to cell 2 will never happen.

In a similar manner, if the relation between freq 1 and freq 2 is not configured, i.e. freq 1 does not know about freq 2, then, the cells with freq 1 do not know about the cells with freq 2. Hence, user equipments 121 in cells with freq 1 cannot perform handover to cells with freq 2.

Alternatively, in some embodiments, the network node 110 may refrain from configuring relations between cells in the network node 110 which do not belong to the same PLMN, e.g. by not using the "EUtranCell Relation" to define the relation between different cells which does not belong to the same PLMN. This may advantageously prevent HO to be performed between cells belonging to different PLMNs, i.e. different network operators.

It should be noted that this configuration also applies to an extended scenario wherein multiple network operators share the same network node 110 or eNodeB and having their own different cells, even though these cells may be the same frequency.

It should also be noted that "EUtranCell Relation" means that different cells in LTE (EUtran) have relations. However, if a relation between a cell 1 and cell 2 is not configured, then cell 1 and cell 2 will not know about each other. Then, the user equipments 121 in cell 1 cannot be handover to cell 2 and vice versa.

It should further be noted that since this embodiment describes EUtran, the handover referred to here is about intra LTE handover.

According to some embodiments, the user equipments 121 belonging to a first network operator operating the first PLMN are only permitted to select/reselect cells belonging to the first PLMN. Hence, the PLMNs of different network operators may be made disjunctive and operated separately from each other within the same network node 110.

Hence, according to the above, a technique to provide simple and easy way to obtain different MORAN network configurations in a telecommunications system 100 is presented. The different MORAN network configurations in a telecommunications system 100 may e.g. be based on at least one of a MOCN, a GWCN and a MORAN network configuration.

Also, since a MORAN network configuration may require different S1 connections between the network node 110 and more central nodes in the PLMNs of the different network operators, a MORAN network configuration may be very difficult to achieve. This disadvantage is overcome by the embodiments presented herein.

The example embodiments presented herein may be utilized in a telecommunications system 100, which may further comprise network nodes, such as, a base station 110, as illustrated in FIG. 5. The telecommunications system 100 may also comprise a user equipment 121, as illustrated in FIG. 6. It should be appreciated that the examples provided in FIGS. 5 and 6 are shown merely as non-limiting examples. According to the example embodiments, the network node 110 and user equipment 121 may be any other node as described in the examples provided in the above sections.

As shown in FIG. 5, the example network node 110 may comprise processing circuitry 503, a memory 502, radio circuitry 501, a network interface 504 and at least one antenna. The processing circuitry 503 may comprise Radio Frequency (RF) circuitry and baseband processing circuitry (not shown). In particular embodiments, some or all of the functionality described above as being provided by a mobile base station, a base station controller, a relay node, a NodeB, an enhanced NodeB, positioning node, and/or any other type of mobile communications node may be provided by the processing circuitry 503 executing instructions stored on a computer-readable medium, such as the memory 502 shown in FIG. 5. Alternative embodiments of the network node 110 may comprise additional components responsible for providing additional functionality, comprising any of the functionality identified above and/or any functionality necessary to support the solution described above. In other example embodiments, a network node 110 may be not equipped with a radio interface or radio circuitry 501.

It should be appreciated that the processing circuitry 503, or any other hardware and/or software unit configured to execute operations and/or commands, of the network node 110 may be configured to configure a primary PLMN information for one or more cells 140 in the network node 110 to comprise neither of a first or a at least one second PLMN, wherein the first or a at least one second PLMN may share the network node 110. Also, it may be configured to configure further PLMN information for each cell of the one or more cells in the network node 110 based on information indicating to which of the first or at least one second PLMNs each cell belongs to.

The primary PLMN information may indicate a PLMN or PLMN identity which is not served by any MME and which is not owned by any network operator.

In some embodiments, the processing circuitry is further configured to configure, for each cell in the network node belonging to the first PLMN, a cellReservedForOperatorUse IE associated with the first PLMN to "Not Reserved"; and to configure, for each cell in the network node belonging to the first PLMN, the cellReservedForOperatorUse IE associated with another PLMN to "Reserved".

In some embodiments, the processing circuitry is further configured to configure, for each cell in the network node belonging to the second PLMN, the cellReservedForOperatorUse IE associated with the second PLMN to "Not Reserved"; and to configure, for each cell in the network node belonging to the second PLMN, the cellReservedForOperatorUse IE associated with another PLMN to "Reserved".

The processing circuitry 503 may be further configured to refrain from configuring frequency relations between different frequencies in the network node 110.

In some embodiments, the processing circuitry 503 is further configured to refrain from configuring relations between cells in the network node 110 which do not belong to the same PLMN.

It should be appreciated that the antenna, or any other hardware and/or software unit is configured to broadcast cell status and cell reservations using SIB1 and according to the configured primary PLMN information and further PLMN information. The primary PLMN may be the first PLMN identity in the SIB1.

The telecommunications system 100 may be based on at least one of a MOCN, a GWCN, and a MORAN network configuration.

An example of a user equipment 121 is provided in FIG. 6. The example user equipment 121 may comprise processing circuitry 602, a memory 603, radio circuitry 601, and at least one antenna. The radio circuitry 601 may comprise RF circuitry and baseband processing circuitry (not shown). In particular embodiments, some or all of the functionality described above as being provided by mobile communication devices or other forms of wireless device may be provided by the processing circuitry 602 executing instructions stored on a computer-readable medium, such as the memory 603 shown in FIG. 6. Alternative embodiments of the user equipment 121 may comprise additional components responsible for providing additional functionality, comprising any of the functionality identified above and/or any functionality necessary to support the solution described above.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or Global Positioning System (GPS) receiver; a Personal Communications System (PCS) terminal that may combine a cellular radiotelephone with data processing; a PDA that can include a radiotelephone or wireless communication system; a laptop; a camera (e.g., video and/or still image camera) having communication ability; and any other computation or communication device capable of transceiving, such as a personal computer, a home entertainment system, a television, etc.

Although the description is mainly given for a user equipment 121, as measuring or recording unit, it should be understood by the skilled in the art that "user equipment" is a non-limiting term which means any wireless device or node capable of receiving in DownLink (DL) and transmitting in UpLink (UL) (e.g. PDA, laptop, mobile, sensor, fixed relay, mobile relay or even a radio base station, e.g. femto base station).

A cell is associated with a radio node, where a radio node or radio network node or network node or base station or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of Carrier Aggregation (CA). It may also be a single- or multi-Radio Access Technology (RAT) node. A multi-RAT node may comprise a node with co-located RATs or supporting Multi-Standard Radio (MSR) or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), Compact Discs (CDs), Digital Versatile Discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

The invention claimed is:

1. A method in a radio network node for configuring the radio network node to support a plurality of Public Land Mobile Networks (PLMNs) in one or more cells served by the radio network node, in a telecommunications system, the method comprising:
   configuring a primary PLMN information for the one or more cells served by the radio network node, wherein the primary PLMN information is information other than PLMN identifiers of any of the plurality of PLMNs in the one or more cells served by the radio network node, and wherein the primary PLMN information indicates a PLMN or PLMN identity which is not served by any Mobility Management Entity (MME);
   configuring further PLMN information for each of the one or more cells served by the radio network node based on information indicating to which of the plurality of PLMNs each of the one or more cells belongs to; and
   constructing a global identity for the radio network node comprising the primary PLMN information.

2. The method according to claim 1, further comprising:
   configuring, for each cell in the radio network node belonging to a first PLMN of the plurality of PLMNs, a cellReservedForOperatorUse Information Element (IE) associated with the first PLMN to "Not Reserved"; and
   configuring, for each cell in the radio network node belonging to the first PLMN, the cellReservedForOperatorUse IE associated with another of the plurality of PLMNs to "Reserved".

3. The method according to claim 1, further comprising:
   configuring, for each cell in the radio network node belonging to a second PLMN of the plurality of PLMNs, the cellReservedForOperatorUse IE associated with the second PLMN to "Not Reserved"; and
   configuring, for each cell in the radio network node belonging to the second PLMN, the cellReservedForOperatorUse IE associated with another of the plurality of PLMNs to "Reserved".

4. The method according to claim 1, further comprising:
   refraining from configuring frequency relations between different frequencies in the radio network node.

5. The method according to claim 1, further comprising:
   refraining from configuring relations between cells in the radio network node which do not belong to the same PLMN.

6. The method according to claim 1, wherein the telecommunications system is based on at least one of a Multiple Operator Core Network (MOCN), a GateWay Core Network (GWCN), or a Multiple Operator Radio Access Network (MORAN) network configuration.

7. A radio network node for configuring the radio network node to support a plurality of Public Land Mobile Networks (PLMNs) in one or more cells served by the radio network node in a telecommunications system, the radio network node comprising:
    a processing circuitry configured to:
        configure a primary PLMN information for the one or more cells served by the radio network node, where the primary PLMN information is information other than PLMN identifiers of any of the plurality of PLMNs in the one or more cells served by the radio network node, and wherein the primary PLMN information indicates a PLMN or PLMN identity which is not served by any Mobility Management Entity (MME); and to
        configure further PLMN information for each of the one or more cells in the radio network node based on information indicating to which of the plurality of PLMNs each of the one or more cells belongs to; and to
        construct a global identity for the radio network node comprising the primary PLMN information.

8. The radio network node according to claim 7, wherein the processing circuitry is further configured to:
    configure, for each cell in the radio network node belonging to a first PLMN of the plurality of PLMNs, a cellReservedForOperatorUse Information Element (IE) associated with the first PLMN to "Not Reserved"; and to
    configure, for each cell in the radio network node belonging to the first PLMN, the cellReservedForOperatorUse IE associated with another of the plurality of PLMNs to "Reserved".

9. The radio network node according to claim 7, wherein the processing circuitry is further configured to:
    configure, for each cell in the radio network node belonging to a second PLMN of the plurality of PLMNs, the cellReservedForOperatorUse IE associated with the second PLMN to "Not Reserved"; and to
    configure, for each cell in the radio network node belonging to the second PLMN, the cellReservedForOperatorUse IE associated with another of the plurality of PLMNS to "Reserved".

10. The radio network node according to claim 7, wherein the processing circuitry is further configured to:
    refrain from configuring frequency relations between different frequencies in the radio network node.

11. The radio network node according to claim 7, wherein the processing circuitry is further configured to:
    refrain from configuring relations between cells in the radio network node which do not belong to the same PLMN.

12. The radio network node according to claim 7, wherein the telecommunications system is based on at least one of a Multiple Operator Core Network (MOCN), a GateWay Core Network (GWCN) or, a Multiple Operator Radio Access Network (MORAN) network configuration.

\* \* \* \* \*